US012572044B2

(12) United States Patent
Derks et al.

(10) Patent No.: US 12,572,044 B2
(45) Date of Patent: Mar. 10, 2026

(54) DISPLAY SYSTEM

(71) Applicant: 3M INNOVATIVE PROPERTIES COMPANY, St. Paul, MN (US)

(72) Inventors: Kristopher J. Derks, Woodbury, MN (US); Shannon L. Siefken, Woodbury, MN (US); Tao Liu, Woodbury, MN (US); Nathaniel K. Naismith, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 136 days.

(21) Appl. No.: 18/434,949

(22) Filed: Feb. 7, 2024

(65) Prior Publication Data

US 2024/0176194 A1 May 30, 2024

Related U.S. Application Data

(62) Division of application No. 17/597,809, filed as application No. PCT/IB2020/057521 on Aug. 10, 2020, now Pat. No. 11,927,855.

(60) Provisional application No. 62/888,709, filed on Aug. 19, 2019.

(51) Int. Cl.
*G02F 1/1347* (2006.01)
*F21V 8/00* (2006.01)
*G02F 1/1335* (2006.01)

(52) U.S. Cl.
CPC ....... *G02F 1/13478* (2021.01); *G02B 6/0051* (2013.01); *G02B 6/0053* (2013.01); *G02B 6/0055* (2013.01); *G02B 6/0068* (2013.01); *G02F 1/133504* (2013.01); *G02F 1/133536* (2013.01); *G02F 1/133514* (2013.01)

(58) Field of Classification Search
CPC .................................................. G02F 1/13478
See application file for complete search history.

(56) References Cited

U.S. PATENT DOCUMENTS

| | | | |
|---|---|---|---|
| 6,643,224 | B1 | 11/2003 | Sekiguchi et al. |
| 2002/0176036 | A1 | 11/2002 | Kaneko |
| 2010/0110337 | A1* | 5/2010 | Shin ................. G02F 1/133615 |
| | | | 362/97.4 |
| 2011/0051047 | A1 | 3/2011 | O'Neill et al. |

(Continued)

FOREIGN PATENT DOCUMENTS

| | | |
|---|---|---|
| JP | 2016170221 A | 9/2016 |
| JP | 2017173785 A | 9/2017 |
| KR | 20120040808 A | 4/2012 |

OTHER PUBLICATIONS

International Search Report for PCT International Application No. PCT/IB2020/0575721, mailed on Oct. 27, 2020, 4 pages.

*Primary Examiner* — Edmond C Lau
(74) *Attorney, Agent, or Firm* — Clifton F. Richardson

(57) ABSTRACT

A display system includes an extended illumination source, a first liquid crystal assembly disposed on the extended illumination source, and a second liquid crystal assembly disposed on the first liquid crystal display assembly. The first liquid crystal assembly includes a bottom reflective polarizer, a top reflective polarizer, and a bottom liquid crystal panel disposed between the top and bottom reflective polarizers. The second liquid crystal assembly includes a top absorbing polarizer, and a top liquid crystal panel disposed between the top absorbing polarizer and the first liquid crystal assembly.

6 Claims, 3 Drawing Sheets

(56)  References Cited

U.S. PATENT DOCUMENTS

| 2014/0049734 | A1 | 2/2014 | Erinjippurath et al. |
| 2017/0097513 | A1 | 4/2017 | Bell |
| 2019/0137817 | A1 | 5/2019 | Yasui et al. |
| 2020/0124913 | A1 | 4/2020 | Masuda |

* cited by examiner 61,91

60,90

DISPLAY SYSTEM

CROSS-REFERENCE TO RELATED APPLICATIONS

This application is a divisional of U.S. application Ser. No. 17/597,809, filed Jan. 25, 2022, which is a national stage filing under 35 U.S.C. 371 of PCT/IB2020/057521, filed Aug. 10, 2020, which claims the benefit of U.S. Application No. 62/888,709, filed Aug. 19, 2019, the disclosures of which are incorporated by reference in their entireties herein.

TECHNICAL FIELD

The present disclosure relates generally to a display system, and in particular, to a liquid crystal display system.

BACKGROUND

A liquid crystal display (LCD) uses light-modulating properties of liquid crystals. Liquid crystals do not emit light directly and a backlight or reflector is used to produce images in color or monochrome. Conventional LCD panel display may have a low on-axis contrast and a low efficiency.

SUMMARY

In one aspect, the present disclosure provides a display system. The display system includes an extended illumination source, a first liquid crystal assembly and a second liquid crystal assembly. The extended illumination source is configured to emit light over an extended emission surface of the extended illumination source and includes at least one light source. The first liquid crystal assembly is configured to selectively transmit and reflect light received from the extended emission surface of the extended illumination source. The first liquid crystal assembly is disposed on the extended illumination source. The first liquid crystal assembly includes a bottom reflective polarizer facing the extended illumination source and configured to substantially transmit light having a first polarization state and substantially reflect light having an orthogonal second polarization state, and a top reflective polarizer facing away from the extended illumination source and configured to substantially transmit light having the second polarization state and substantially reflect light having the first polarization state. The first liquid crystal assembly further includes a bottom liquid crystal panel disposed between the top and bottom reflective polarizers and configured to selectively and at least partially transmit and reflect light transmitted by the bottom reflective polarizer. The second liquid crystal assembly is configured to receive light from the first liquid crystal assembly and emit an image for viewing by a viewer. The second liquid crystal assembly is disposed on the first liquid crystal assembly. The second liquid crystal assembly includes a top absorbing polarizer facing away from the first liquid crystal assembly and configured to substantially transmit light having the first polarization state and substantially absorb light having the second polarization state, and a top liquid crystal panel disposed between the top absorbing polarizer and the first liquid crystal assembly and configured to receive light transmitted by the first liquid crystal assembly and form an image for viewing by the viewer.

In another aspect, the present disclosure provides a display system including a monochromatic display including N1 individually addressable pixels. The display system further includes a color display disposed on the monochromatic display and including N2 individually addressable pixels, N2≥N1>100. The color, but not the monochromatic, display includes a color filter. The monochromatic display and the color display form substantially a same image. The monochromatic display includes at least one reflective, but no absorbing, polarizer to form an image. The color display includes at least one absorbing polarizer to form an image.

In yet another aspect, the present disclosure provides an extended polarized light source system including an extended illumination source and a liquid crystal assembly. The extended illumination source includes a first extended emission surface, a reflecting layer, an optically diffusive layer facing, and spaced apart from, the reflecting layer, the reflecting layer and the optically diffusive layer defining an optical cavity therebetween, and at least one light source providing light to the optical cavity. The liquid crystal assembly is disposed on the extended illumination source. The liquid crystal assembly includes a second extended emission surface substantially co-extensive with the first extended emission surface and a pixelated liquid crystal panel disposed between first and second reflective polarizers. A first light exiting the extended illumination source from the first extended emission surface has a first intensity variation across the first extended emission surface. The liquid crystal assembly receives the first light and transmits at least a portion of the received light. The transmitted light exiting the liquid crystal assembly from the second extended emission surface has a second intensity variation across the second extended emission surface. The second intensity variation is less than the first intensity variation.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a display system. The display system may be used in electronic devices that incorporate liquid crystal displays (LCDs), such as computer monitors, television monitors, mobile phones, digital cameras, portable music players, personal digital assistants (PDAs), wearable devices and other portable devices. The display system includes an extended illumination source, a first liquid crystal assembly and a second liquid crystal assembly. The extended illumination source is configured to emit light and includes at least one light source. The first liquid crystal assembly is disposed on the extended illumination source and is configured to selectively transmit and reflect light received from the extended illumination source. The first liquid crystal assembly includes a bottom reflective polarizer and a top reflective polarizer. The first liquid crystal assembly further includes a bottom liquid crystal panel disposed between the top and bottom reflective polarizers. The second liquid crystal assembly is configured to receive light from the first liquid crystal assembly and emit an image for viewing by a viewer.

By including the first liquid crystal assembly with the top and bottom reflective polarizers, light that would normally be absorbed by the second liquid crystal assembly may be reflected and recycled. Recycling of light may lead to an increase in an on-axis contrast of the display system. In some cases, the display system of the present disclosure may be configured to emit an image having an on-axis contrast that is greater by at least a factor of two than a comparative display system that comprises the same construction except that it does not include the first liquid crystal assembly. Recycled light may be transported to on state regions, thereby increasing an efficiency of the display system. Therefore, the display system may further reduce power drain on a battery and reduce the battery size in handheld or portable devices.

The present disclosure also relates to an extended polarized light source including an extended illumination source and a liquid crystal assembly disposed on the extended illumination source. The liquid crystal assembly includes a liquid crystal panel disposed between two reflective polarizers. The liquid crystal panel assembly may decrease intensity variation of light emitted by the extended polarized light source.

Figure 1:
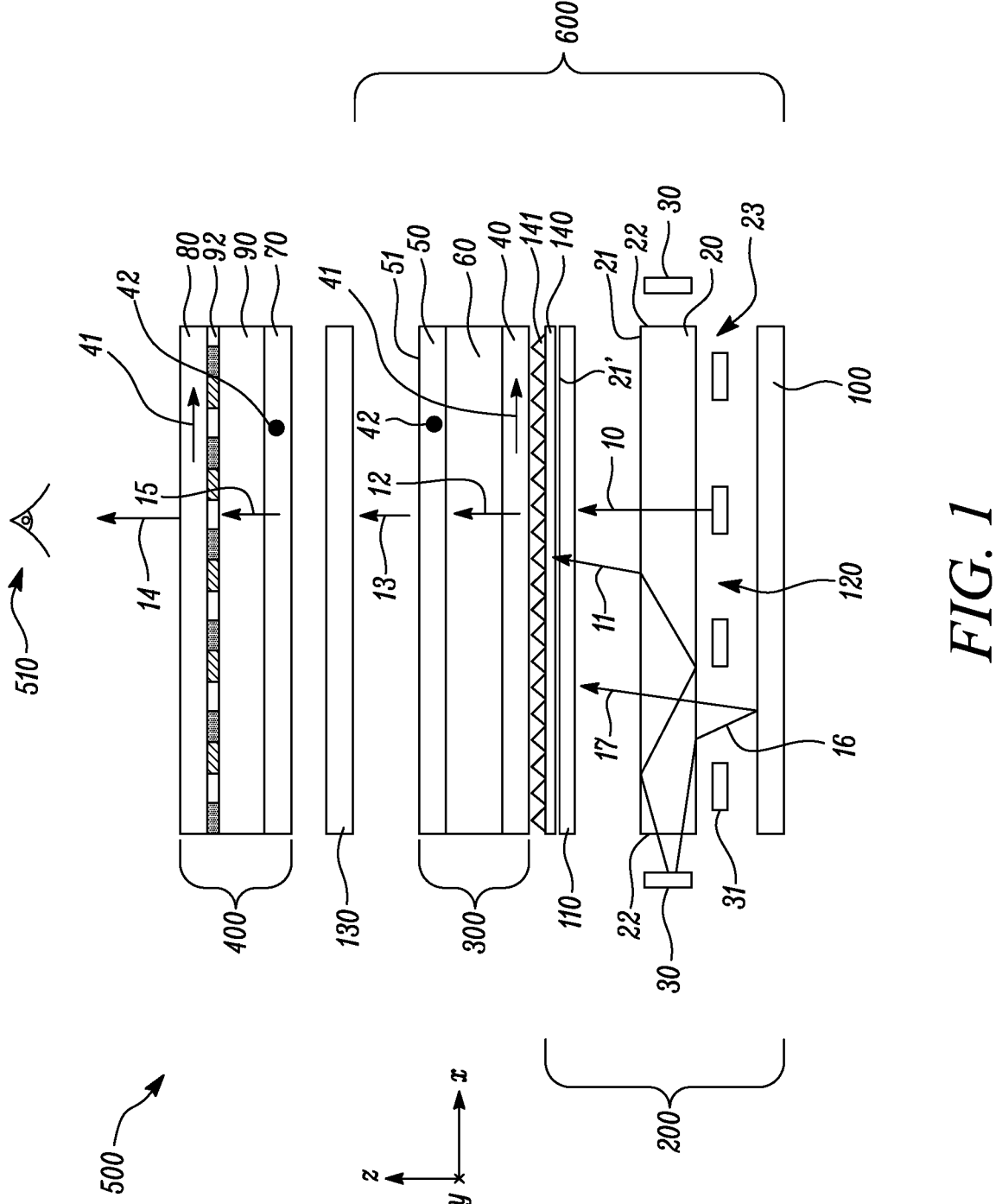
FIG. 1 is a schematic view of a display system according to one embodiment of the present disclosure.

Referring now to the Figures, FIG. 1 illustrates a display system 500 including an extended illumination source 200, a first liquid crystal assembly 300 and a second liquid crystal assembly 400.

The display system 500 defines mutually orthogonal x, y and z-axes. The x and y-axes are in-plane axes of the display system 500, while the z-axis is a transverse axis disposed along a thickness of the display system 500. In other words, the x and y-axes are disposed along a plane of the display system 500, while the z-axis is perpendicular to the plane of the display system 500. The extended illumination source 200, the first liquid crystal assembly 300 and the second liquid crystal assembly 400 of the display system 500 are disposed adjacent to each other along the z-axis.

The extended illumination source 200 is configured to emit light 10, 11 over an extended emission surface 21 or 21' of the extended illumination source 200 and includes the at least one light source 30, 31. The at least one light source 30, 31 generates light that illuminates the display system 500. In some embodiments, the at least one light source 30, 31 includes one or more light emitters which emit light. The light emitters may be, for example, light emitting diodes (LEDs), fluorescent lights, or any other suitable light emitting device. The LEDs may be monochromatic, or may include a number of emitters operating at different wavelengths in order to produce a white light output.

In some embodiments, the extended illumination source 200 further includes a lightguide 20 for propagating light 10, 11 therein along a length and a width of the lightguide 20. The length of the lightguide 20 is defined along the x-axis, while the width of the lightguide 20 is defined along the y-axis. The lightguide 20 faces the first liquid crystal assembly 300 and includes the extended emission surface 21. The lightguide 20 includes a pair of opposing edge surfaces 22 spaced apart from each other relative to the x-axis. The lightguide 20 may be made of an optically transparent material. The lightguide 20 may be a plate having multiple structures for guiding light.

In some embodiments, the at least one light source 30 is disposed proximate the edge surface 22 of the lightguide 20. In the illustrated embodiment of FIG. 1, the display system 500 includes a first set of light sources 30 and a second set of light sources 31. The first set of light sources 30 are located proximate the respective edges surfaces 22 of the lightguide 20. Further, the second set of light sources 31 are located proximate a longitudinal surface of the lightguide 20. In some other embodiments, only of the first and second sets of light sources 30, 31 may be present. The first set of light sources 30 emit light 11, while the second set of light sources 31 emit light 10.

Light 10 from the light sources 31 propagates through lightguide 20 towards the first liquid crystal assembly 300. The lightguide 20 further guides light 11 from the light sources 30 and directs light 11 towards the first liquid crystal assembly 300. In some embodiments, the lightguide 20 may use total internal reflection (TIR) to transport or guide light 11 from the light sources 30 located proximate the respective edge surfaces 22 towards the first liquid crystal assembly 300. In some cases, the lightguide 20 may improve uniformity of light emitted by the display system 500.

The extended illumination source 200 includes a reflecting layer 100 facing a bottom side 23 of the lightguide 20 away from the first liquid crystal assembly 300. The reflecting layer 100 is configured to reflect light 16 that exits the lightguide 20 toward the reflecting layer 100 back. Reflected light 17 from the reflecting layer 100 propagates toward the first liquid crystal assembly 300. In some embodiments, reflecting layer 100 may also be useful for recycling light within the display system 500. The reflecting layer 100 may be a specular reflector or a diffuse reflector. In some embodiments, the reflecting layer 100 may be an Enhanced Diffuse Reflector (EDR) film produced by the 3M Company. The reflective properties of reflecting layer 100 can be described by the bidirectional reflectivity distribution functions (BRDF). The BRDF describes the radiance reflected into every inward direction for unit radiance incident in any outward direction. The reflecting layer 100 may have a reflectivity for normally incident light of any polarization of at least 80%, at least 90%, at least 95%, at least 98%, or at least 99%. The reflecting layer 100 may include a reflecting surface (e.g., a metallic surface) or may have a multi-layer configuration. The reflecting layer 100 has an average diffuse reflectance (RD) and an average specular reflectance (RS). In some embodiments, for substantially normally incident light in a visible wavelength range from about 420 nm to about 680 nm, the reflecting layer 100 has $RS > RD > 10\%$.

In some embodiments, the extended illumination source 200 includes a first optically diffusive layer 110 for scattering light. The first optically diffusive layer 110 faces the first liquid crystal assembly 300 and includes the extended emission surface 21'. The first optically diffusive layer 110 may be used to diffuse light 10, 11 received from the light sources 30, 31. This may increase a uniformity of illumination light incident on the first liquid crystal assembly 300. Consequently, this may result in an image perceived by a viewer to be more uniformly bright. In some embodiments, the first optically diffusive layer 110 may include an adhesive layer.

In some embodiments, the first optically diffusive layer 110 is substantially polarization preserving. In some embodiments, for normally incident light having a predetermined polarization state, the first optically diffusive layer 110 transmits the incident light with at least 70% of the transmitted light having the predetermined polarization state. In some embodiments, for normally incident light having a predetermined polarization state, the first optically diffusive layer 110 transmits the incident light with at least 80%, at least 90%, at least 95%, or at least 98% of the transmitted light having the predetermined polarization state.

The first optically diffusive layer 110 may be an optional component. In case the first optically diffusive layer 110 is not present, the lightguide 20 includes the extended emission surface 21 of the extended illumination source 200.

The extended illumination source 200 includes the reflecting layer 100 facing the first optically diffusive layer 110. The reflecting layer 100 and the first optically diffusive layer 110 define an optical cavity 120 therebetween. In some embodiments, the at least one light source 31 is disposed in the optical cavity 120. In other words, the optical cavity 120 is an enclosure designed to contain the at least one light source 31 and direct light from the at least one light source 31 toward the first liquid crystal assembly 300. In some embodiments, the optical cavity 120 may be made separately by molding, embossing, casting or electroforming. In the illustrated embodiment of FIG. 1, the light sources 30 are disposed proximate the respective edge surfaces 22 of the lightguide 20, while the light sources 31 are disposed in the optical cavity 120.

The display system 500 includes the first liquid crystal assembly 300 configured to selectively transmit and reflect light 10, 11, 17 received from the extended emission surface 21 or 21' of the extended illumination source 200. Light 10 is emitted by the light sources 31. Light 11 is emitted by the light sources 30. Light 17 is reflected from the reflecting layer 100 and propagates through the lightguide 20. The first liquid crystal assembly 300 is disposed on the extended illumination source 200. In some embodiments, the first liquid crystal assembly 300 and the extended illumination source 200 are bonded together, for example, by means of an optical adhesive, epoxy, lamination, or any other suitable method of attachment.

The first liquid crystal assembly 300 includes a bottom reflective polarizer 40 facing the extended illumination source 200 and a top reflective polarizer 50 facing away from the extended illumination source 200. In some embodiments, each of the top and bottom reflective polarizers 50, 40 includes one or more of a multilayer polymeric reflective polarizer, a wire grid reflective polarizer, and a diffuse reflective polarizer.

In some embodiments, the bottom reflective polarizer 40 is configured to substantially transmit light having a first polarization state 41 along x-axis and substantially reflect light having an orthogonal second polarization state 42 along y-axis. In some embodiments, the first polarization state 41 is S polarization state and the second polarization state 42 is P polarization state. In some other embodiments, the first polarization state 41 is P polarization state and the second polarization state 42 is S polarization state.

In some embodiments, the top reflective polarizer 50 is configured to substantially transmit light having the second polarization state 42 and substantially reflect light having the first polarization state 41.

The first liquid crystal assembly 300 further includes a bottom liquid crystal panel 60 disposed between the top and bottom reflective polarizers 50, 40. The bottom liquid crystal panel 60 is configured to selectively and at least partially transmit and reflect light 12 transmitted by the bottom reflective polarizer 40. In some embodiments, the bottom liquid crystal panel 60 includes a plurality of individually addressable pixels 61 (shown in FIG. 2). In some embodiments, the bottom liquid crystal panel 60 is a monochrome display including the plurality of individually addressable pixels 61.

The display system 500 further includes the second liquid crystal assembly 400 configured to receive light 13 from the first liquid crystal assembly 300 and emit an image 14 for viewing by a viewer 510. The second liquid crystal assembly 400 is disposed on the first liquid crystal assembly 300. In some embodiments, the second liquid crystal assembly 400 and the first liquid crystal assembly 300 are bonded to each other, for example, by means of an optical adhesive, epoxy, lamination, or any other suitable method of attachment.

The second liquid crystal assembly 400 includes a top absorbing polarizer 80 facing away from the first liquid crystal assembly 300, and a top liquid crystal panel 90 disposed between the top absorbing polarizer 80 and the first liquid crystal assembly 300.

In some embodiments, the top absorbing polarizer 80 is configured to substantially transmit light having the first polarization state 41 and substantially absorb light having the second polarization state 42.

The top liquid crystal panel 90 is configured to receive light 15 transmitted by the first liquid crystal assembly 300 and form the image 14 for viewing by the viewer 510. In some embodiments, the top liquid crystal panel 90 includes a plurality of individually addressable pixels 91 (shown in FIG. 2).

In some embodiments, the first liquid crystal assembly 300 includes a monochromatic display including N1 individually addressable pixels 61 and the second liquid crystal assembly 400 includes a color display including N2 individually addressable pixels 91. The monochromatic display does not include a color filter and the color display includes a color filter 92. In some embodiments, N2≥N1>100. The first liquid crystal assembly 300 and the second liquid crystal assembly 400 form substantially a same image (i.e., the image 14).

In some embodiments, the second liquid crystal assembly 400 further includes a bottom absorbing polarizer 70 disposed between the top liquid crystal panel 90 and the first liquid crystal assembly 300. In some embodiments, the bottom absorbing polarizer 70 is configured to substantially transmit light having the second polarization state 42 and substantially absorb light having the first polarization state 41. In some other embodiments, the bottom polarizer 70 may be a reflective polarizer.

In some embodiments, each of the top and bottom absorptive polarizers 80, 70 are dichroic absorptive polarizers. In some cases, the bottom absorptive polarizer 70 may be omitted.

In some embodiments, the display system 500 further includes a second optically diffusive layer 130 disposed between the first and second liquid crystal assemblies 300, 400. In some embodiments, the second optically diffusive layer 130 may be used to diffuse light 13 received from the first liquid crystal assembly 300. This may increase a uniformity of illumination light incident on the second liquid crystal assembly 400. Consequently, this may result in an image perceived by a viewer to be more uniformly bright. In some embodiments, the second optically diffusive layer 130 may include an adhesive layer. In some embodiments, the second optically diffusive layer 130 is substantially polarization preserving, such that for normally incident light having a predetermined polarization state, the second optically diffusive layer 130 transmits the incident light with at least 70% of the transmitted light having the predetermined polarization state. In some embodiments, for normally incident light having a predetermined polarization state, the second optically diffusive layer 130 transmits the incident light with at least 80%, at least 90%, at least 95%, or at least 98% of the transmitted light having the predetermined polarization state.

In some embodiments, the display system 500 further includes one or more prismatic layers 140 disposed between the first liquid crystal assembly 300 and the extended illumination source 200 for enhancing a brightness of an image (e.g., the image 14) emitted by the display system 500 by at least partially collimating and recycling light 10, 11, 17 emitted by the extended illumination source 200. The one or more prismatic layers 140 includes a plurality of prismatic structures 141. The plurality of prismatic structures 141 may redirect off-axis light in a direction closer to the axis of the display system 500. In some embodiments, an apex angle of each prismatic structure 141 may vary as per desired application attributes.

The one or more prismatic layers 140 may be one of the films manufactured by the 3M Company under the trade name BEF, as in brightness enhancement film. The one or more prismatic layers 140 may also be a more specifically suited custom designed prism array molded, embossed or cast in an optically transparent material, such as acrylic, polyester or polycarbonate.

In some embodiments, the display system 500 is configured to emit an image (for example, the image 14) having an on-axis contrast that is greater by at least a factor of two than a comparative display system that includes the same construction except that it does not include the first liquid crystal assembly 300. In some embodiments, the on-axis contrast is greater by at least a factor of 10. In some embodiments, the on-axis contrast is greater by at least a factor of 100. In some other embodiments, the on-axis contrast is greater by at least a factor of 20, 30, 40, 50, 60, 70, 80, or 90.

The top and bottom reflective polarizers 50, 40 of the first liquid crystal assembly 300 may increase recycling of light within the display system 500. Due to increased recycling, the first liquid crystal assembly 300 may reduce amount of light delivered to off state regions of the second liquid crystal assembly 400, thereby increasing the on-axis contrast of the display system 500.

The images formed by the first liquid crystal assembly 300 and the second liquid crystal assembly 400 may have to be registered. In other words, output images from the first liquid crystal assembly 300 and the second liquid crystal assembly 400 may have to be superimposed correctly. In some cases, pixel for pixel registration of the first liquid crystal assembly 300 and the second liquid crystal assembly 400 may be achieved by physical alignment of the first liquid crystal assembly 300 with respect to the second liquid crystal assembly 400 or vice versa.

The first liquid crystal assembly 300 may also be referred to as a liquid crystal assembly 300. In some embodiments, an extended polarized light source system 600 includes the extended illumination source 200 and the liquid crystal assembly 300 disposed on the extended illumination source 200. In other words, the extended illumination source 200 and the liquid crystal assembly 300 may be combined and assembled together to form the extended polarized light source system 600. In some embodiments, the liquid crystal assembly 300 and the extended illumination source 200 are bonded together, for example, by means of an optical adhesive, epoxy, lamination, or any other suitable method of attachment.

The extended emission surface 21 may also be referred to as a first extended emission surface 21. Further, the first optically diffusive layer 110 may also be referred to as an optically diffusive layer 110. The extended illumination source 200 includes the first extended emission surface 21, the reflecting layer 100, the optically diffusive layer 110 and the at least one light source 30, 31. The optically diffusive layer 110 faces, and is spaced apart from, the reflecting layer 100.

The reflecting layer 100 and the optically diffusive layer 110 define the optical cavity 120 therebetween. The at least one light source 30, 31 provides light to the optical cavity 120. In some embodiments, the at least one light source 31 is disposed within the optical cavity 120. In some other embodiments, the at least one light source 30 is disposed outside the optical cavity 120.

The liquid crystal assembly 300 disposed on the extended illumination source 200 includes a second extended emission surface 51. The second extended emission surface 51 is substantially co-extensive with the first extended emission surface 21.

The bottom liquid crystal panel 60 may also be referred to as a pixelated liquid crystal panel 60. Further, the bottom and top reflective polarizers 40, 50 may be referred to as first and second reflective polarizer 40, 50, respectively. In some embodiments, the liquid crystal assembly 300 includes the pixelated liquid crystal panel 60 disposed between the first and second reflective polarizers 40, 50. In some embodiments, the pixelated liquid crystal panel 60 is a monochrome display including the plurality of individually addressable pixels 61. In some embodiments, the pixelated liquid crystal panel 60 is substantially co-extensive with the first and second extended emission surfaces 21, 51.

A first light (i.e., light 12) exiting the extended illumination source 200 from the first extended emission surface 21 has a first intensity variation across the first extended emission surface 21. The liquid crystal assembly 300 receives the first light 12 and transmits at least a portion of the received light. The transmitted light (i.e., light 13) exiting the liquid crystal assembly 300 from the second extended emission surface 51 has a second intensity variation across the second extended emission surface 51. The second intensity variation is less than the first intensity variation. In some embodiments, the second intensity variation is less than the first intensity variation by at least a factor of two.

The liquid crystal assembly 300 including the first and second reflective polarizers 40, 50 may reduce intensity variation of light emitted by the extended polarized light source system 600. The extended polarized light source system 600 may therefore act as a light source which emits light having reduced intensity variation. Consequently, the second liquid crystal assembly 400 may receive light having reduced intensity variation.

Figure 2:
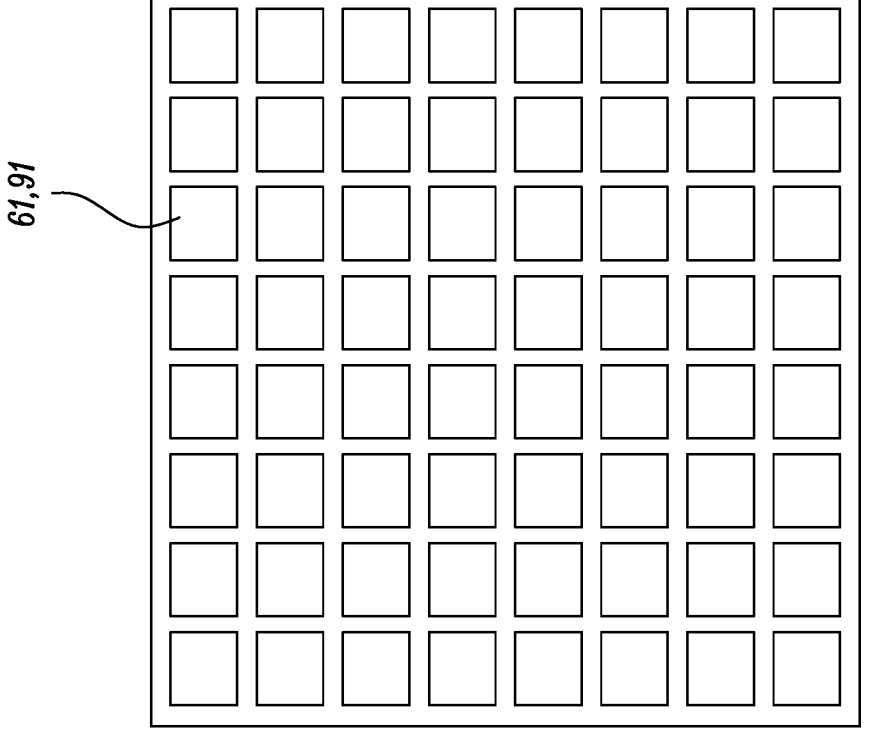
FIG. 2 is a schematic view of a liquid crystal panel according to one embodiment of the present disclosure.

FIG. 2 illustrates a liquid crystal panel. The liquid crystal panel may be one of the bottom liquid crystal panel 60 and the top liquid crystal panel 90.

The bottom liquid crystal panel 60 includes the plurality of individually addressable pixels 61. Similarly, the top liquid crystal panel 90 includes the plurality of individually addressable pixels 91.

In some embodiments, the first liquid crystal assembly 300 may be interchangeably referred to as a monochromatic display 300 and the second liquid crystal assembly 400 may be interchangeably referred to as a color display 400.

Referring to FIGS. 1 and 2, the display system 500 includes the monochromatic display 300 and the color display 400 disposed on the monochromatic display 300. The monochromatic display 300 includes N1 individually addressable pixels 61 and the color display 400 includes N2 individually addressable pixels 91. In some embodiments. N2≥N1>100.

In some embodiments, the color 400, but not the monochromatic 300, display includes the color filter 92. The monochromatic display 300 and the color display 400 form substantially a same image, i.e., the image 14. In some embodiments, the monochromatic display 300 includes at least one reflective 40, 50, but no absorbing, polarizer to form an image. In some embodiments, the color display 400 includes at least one absorbing polarizer 70, 80 to form an image.

In some embodiments, the monochromatic display 300 includes two reflective polarizers 40, 50 to form an image.

In some embodiments, the color display 400 includes one absorbing polarizer 80 and one reflective polarizer 70 to form an image (e.g., the image 14). In this case, the display system 500 includes three reflective polarizers 40, 50, 70. In some other embodiments, the color display 400 includes two absorbing polarizers 70, 80 to form an image 14.

The images formed by the monochromatic display 300 and the color display 400 may have to be registered. In other words, output images from the monochromatic display 300 and the color display 400 may have to be superimposed correctly. In some cases, pixel for pixel registration of the monochromatic display 300 and the color display 400 may be achieved by physical alignment of the monochromatic display 300 with respect to the color display 400 or vice versa.

Additionally, it may also be desirable to eliminate the moiré effect. The moiré effect may be observed as an interference phenomenon when two similar lattices are overlapped. The moiré effect may result from the interference among two or more regular structures having different intrinsic frequencies. Since the plurality of individually addressable pixels 61, 91 have regular pitch structures, there can be a possibility of moiré effect between an image formed by the monochromatic display 300 and an image formed by the color display 400. To prevent the moiré effect, the plurality of individually addressable pixels 61, 91 can be in same order of size. For example, in some cases, N2≥2 N1, N2≥5 N1, N2≥10 N1, or N2≥15 N1. Another method may be to rotate or offset the pixel array of the monochromatic display 300 with respect to the pixel array of the color display 400 or vice versa, to help reduce the moiré effect.

Figure 3:
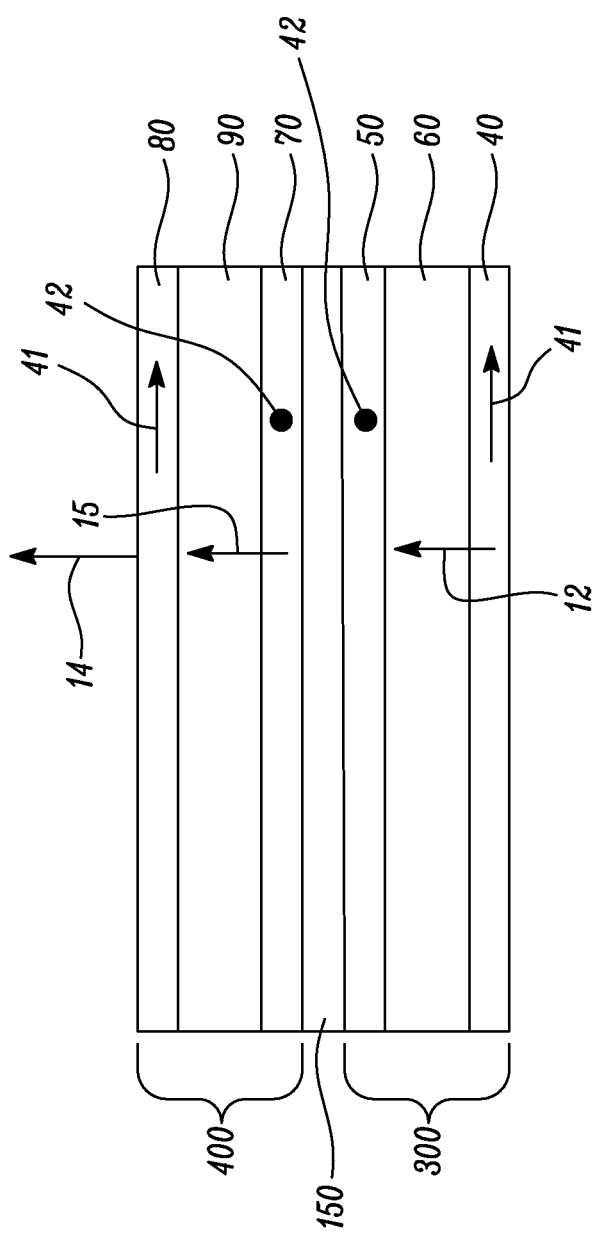
FIG. 3 is a schematic view of first and second liquid crystal assemblies bonded to each other by an optical adhesive layer according to one embodiment of the present disclosure.

FIG. 3 illustrates the first and second liquid crystal assemblies 300, 400. The first liquid crystal assembly 300 includes the top and bottom reflective polarizers 50, 40. The first liquid crystal assembly 300 further includes the bottom liquid crystal panel 60 disposed between the top and bottom reflective polarizers 50, 40. The second crystal assembly 400 includes at least one absorbing polarizer 70, 80 to form an image. In some embodiments, the second crystal assembly 400 includes two absorbing polarizers 70, 80 to form an image. In some other embodiments, the second crystal assembly 400 includes one reflective polarizer 70 and one absorbing polarizer 80.

The display system 500 (shown in FIG. 1) further includes an optical adhesive layer 150 bonding the first and second liquid crystal assemblies 300, 400 to each other. In some embodiments, the optical adhesive layer 150 may include an optically clear adhesive (OCA).

Referring to FIGS. 1 and 2, the pixels 61 of the bottom liquid crystal panel 60 can be activated (on state) or deactivated (off state). Similarly, the pixels 91 of the top liquid crystal panel 90 can be activated (on state) or deactivated (off state). In the off state, the pixels 61, 91 may not substantially change the polarization of light passing therethrough. In the on state, the pixels 61, 91 may change the polarization of light passing therethrough. The bottom liquid crystal panel 60 and the top liquid crystal panel 90 may both have on state regions and off state regions.

The bottom reflective polarizer 40 may allow light having substantially the first polarization state 41 to reach the bottom liquid crystal panel 60. On state regions of the bottom liquid crystal panel 60 may substantially change the polarization of light having the first polarization state 41 to the second polarization state 42. The top reflective polarizer 50 substantially transmits light having the second polarization state 42 and substantially reflects light having the first polarization state 41. The top reflective polarizer 50 may therefore transmit light from on state regions of the bottom liquid crystal panel 60. The second liquid crystal assembly 400 may receive light from the on state regions of the bottom liquid crystal panel 60. On state regions of the top liquid crystal panel 90 may change the polarization state of light from the second state to the first state. Therefore, on state regions of the top and bottom liquid crystal panels 90, 60 may transmit light.

Off state regions of the bottom liquid crystal panel 60 may not change the polarization of received light. Due to the presence of the top and bottom reflective polarizers 50, 40, light in both the first and second polarization states 41, 42 is reflected back to the extended illumination source 200. Therefore, light is recycled instead of being absorbed by off state regions of the second liquid crystal assembly 400. Since light delivered to off state regions is substantially reduced by the bottom reflective polarizer 40 and the top reflective polarizer 50, the on-axis contrast of the display system 500 may be increased. Further, the recycled light may be transported to other on state regions, thereby increasing efficiency of the display system 500. The display system 500 may therefore consume less energy and reduce battery size in handheld or portable devices. In some embodiments, the system efficiency may depend upon a thickness of the optical cavity 120. In some other cases, the system efficiency may further depend upon the BRDF of the reflecting layer 100.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An extended polarized light source system, comprising:

an extended illumination source comprising:

a first extended emission surface;

a reflecting layer;

an optically diffusive layer facing, and spaced apart from, the reflecting layer, the reflecting layer and the optically diffusive layer defining an optical cavity therebetween; and at least one light source providing light to the optical cavity; and a liquid crystal assembly disposed on the extended illumination source and comprising:

a second extended emission surface substantially co-extensive with the first extended emission surface; and a pixelated liquid crystal panel disposed between first and second reflective polarizers, wherein:

a first light exiting the extended illumination source from the first extended emission surface has a first intensity variation across the first extended emission surface, the liquid crystal assembly receiving the first light and transmitting at least a portion of the received light, the transmitted light exiting the liquid crystal assembly from the second extended emission surface having a second intensity variation across the second extended emission surface, the second intensity variation less than the first intensity variation.

2. The extended polarized light source system of claim 1, wherein the at least one light source is disposed within the optical cavity.

3. The extended polarized light source of system of claim 1, wherein the at least one light source is disposed outside the optical cavity.

4. The extended polarized light source of system of claim 1, wherein the pixelated liquid crystal panel is substantially co-extensive with the first and second extended emission surfaces.

5. The extended polarized light source of system of claim 1, wherein the second intensity variation is less than the first intensity variation by at least a factor of two.

6. A display system comprising the extended polarized light source system of claim 1 and a display disposed on the liquid crystal assembly.

* * * * *